United States Patent
Gordon et al.

(10) Patent No.: US 9,246,894 B2
(45) Date of Patent: Jan. 26, 2016

(54) COMMUNICATING STATE INFORMATION TO LEGACY CLIENTS USING LEGACY PROTOCOLS

(71) Applicant: Microsoft Corporation, Redmond, WA (US)

(72) Inventors: Ariel N. Gordon, Kirkland, WA (US);
David J. Steeves, Seattle, WA (US);
Luke T. Abrams, Seattle, WA (US);
Pui-Yin Wong, Bellevue, WA (US);
Krishna C. Vitaldevara, Fremont, CA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 113 days.

(21) Appl. No.: 13/663,501

(22) Filed: Oct. 30, 2012

(65) Prior Publication Data
US 2014/0123257 A1   May 1, 2014

(51) Int. Cl.
*G06F 7/04*     (2006.01)
*H04L 29/06*    (2006.01)
*H04L 29/08*    (2006.01)

(52) U.S. Cl.
CPC ............ *H04L 63/08* (2013.01); *H04L 67/1095* (2013.01)

(58) Field of Classification Search
CPC ....... G06Q 20/10; G06Q 20/32; G06Q 20/42; G06Q 20/425; G06Q 40/00; H04L 2463/102; H04L 63/0876; H04L 63/18; H04W 12/06; G06F 9/544
USPC .......................................................... 726/7
See application file for complete search history.

(56) References Cited

U.S. PATENT DOCUMENTS

| 7,904,949 B2 | 3/2011 | Bowers et al. | |
| 2003/0084205 A1* | 5/2003 | Nakajima | 709/400 |

(Continued)

FOREIGN PATENT DOCUMENTS

WO      2012040869 A1    4/2012

OTHER PUBLICATIONS

"Password Action Notification", Retrieved at <<http://www.manageengine.com/products/passwordmanagerpro/help/password_action_notifications.html>>, Retrieved Date: Aug. 22, 2012, pp. 4.
"6.3 Retrying Synchronization after a Failure", Retrieved at <<http://www.novell.com/documentation//idm401drivers/ad/?page=/documentation//idm401drivers/ad/data/bpbhfdq.html>>, Retrieved Date: Aug. 22, 2012, pp. 3.

(Continued)

*Primary Examiner* — Dant Shaifer Harriman
*Assistant Examiner* — Abiy Getachew
(74) *Attorney, Agent, or Firm* — Aneesh Mehta; Kate Drakos; Micky Minhas (57) ABSTRACT

When a user account is in an alternate (fault) state, communication or sync between an application provider and a device or client application typically is interrupted. When parties do not support rich fault messaging, communication of the reason for the interruption and remediation steps has been impossible. An application server provides rich fault messaging using applications that do not provide explicit error messaging and protocols that do not provide explicit error messaging without changing either the application or the protocol by additional interactions between an identity provider and the application server. The application server uses authentication state information provided by the identity server to generate a notification sync event that appears to the application and the protocol to be a normal sync event. The notification sync event is used to provide the user with information needed to determine what the problem with the account is and how to fix it.

20 Claims, 4 Drawing Sheets

(56) References Cited

U.S. PATENT DOCUMENTS

| | | | |
|---|---|---|---|
| 2004/0230661 A1 | 11/2004 | Rashid et al. | |
| 2008/0282091 A1 | 11/2008 | Ashok et al. | |
| 2008/0313731 A1* | 12/2008 | Iftimie et al. | 726/18 |
| 2010/0169428 A1* | 7/2010 | Balasubramanian | 709/206 |
| 2011/0307949 A1 | 12/2011 | Ronda et al. | |
| 2012/0144457 A1 | 6/2012 | Counterman | |
| 2012/0151563 A1 | 6/2012 | Bolik et al. | |

OTHER PUBLICATIONS

"International Preliminary Report on Patentability", Mailed Date: May 14, 2015, Application No. PCT/US2013/067361, Filed date: Oct. 30, 2013, pp. 6.

"International Search Report and Written Opinion", Mailed Date: Feb. 20, 2014, Application No. PCT/US2013/067361, Filed date: Oct. 30, 2013, pp. 8.

* cited by examiner

COMMUNICATING STATE INFORMATION TO LEGACY CLIENTS USING LEGACY PROTOCOLS

BACKGROUND

Many applications and services rely on username and password to authenticate a user. The user may be asked to enter his credentials each time he logs in. Sometimes the user's credentials are stored. Some applications access a second application on the user's behalf using a token. For example, a first application (called a "relying party" because the application relies on another entity to authenticate the user) can present the user's credentials to an identity provider. In response to successful authentication, the identity provider can then send the first application a token which the first application can use to access a second application on the user's behalf. Frequently, the second application updates information (e.g., data files) on the client application or device. Ensuring that computer files in two or more locations are updated according to a set of rules is called synchronizing or "syncing". For example, when a smartphone application accesses an online email provider, the user's inbox is synced with the email provider's inbox for the user by, for example, receiving the user's new emails on the smartphone.

When a user account is locked, applications and devices stop syncing (i.e., data files are not updated). To continue the smartphone example above, the user does not receive his new emails. Typically, the user has to take one or more actions to re-enable sync. Before taking these actions, the user may have to perform other tasks first, such as proving his identity. A number of tests have been devised to attempt to confirm that a user is who he says he is. As one example of many, Captcha is a type of challenge-response test that attempts to ensure that the response is really generated by a person. Another type of test asks a user to provide secondary proof of identity by providing profile information such as birthdate or answers to questions that agree with answers previously provided by the user and saved by the system. Yet another type of test asks a user to provide the one time code that is sent to an email address or mobile phone number previously provided by the user and saved by the system. When the user is able to successfully pass whatever test he is presented with, the account is unlocked. Other user actions such as updating a password may be requested before sync is re-enabled.

Existing synchronization mechanisms can include the programs used to synchronize files and the protocol used by the synchronizing programs. Some communications between applications and devices rely on legacy protocols that do not support rich fault messaging. Examples of protocols that lack rich fault messaging include but are not limited to POP, IMAP, Exchange Active Sync, and certain rich client interfaces used, for example, for email applications embedded into smartphones, smartphone authentication and game console authentication. These legacy client-server communication protocols do not provide built-in support for identification of the cause of the fault. When a problem with the user's account arises, an application or device that uses one of these legacy protocols may provide only a generic error message such as "unable to sync" without giving the user any information about what the problem is or how it can be fixed (remediation). Even if an existing mechanism uses a protocol that is capable of rich fault messaging, the programs that use the rich fault messaging protocol may not make use of its capabilities.

SUMMARY

When an account or device is in an alternate or locked state that prevents a normal full sync that updates user data files on a client device, an identity management platform can provide the application server with information that enables the application server to usurp the existing synchronization mechanism to send a human readable message, a machine readable message or both a human readable and a machine readable message to the client. The message can be a notification message rather than a normal sync that updates data files on the client device. Instead, an explicit message that describes why the client is in an alternate state can be provided to the user in the notification message. Remediation instructions can be provided to the user in the notification message. Some remediation actions can be performed automatically (without further user input) based on a machine readable message. Because the existing synchronization mechanism is employed, no changes have to be made to the client application or to the protocol the client application uses. From the client's perspective, the message that is received from the application server by the client is indistinguishable from a normal sync message received by the client application and uses the existing protocol used by a normal sync message that updates user data files.

When the application server is a relying party, existing responses received from an identity provider can be augmented to include error responses that indicate that the authentication credential evaluation succeeded but that the client application is in an alternate state. The response received by the application server can include details concerning why authentication did not succeed. The responses from the identity provider can include one or more user actions that have to be taken before authentication can succeed. Information can be provided with respect to the reason for the locked state and the nature of the actions that have to be taken by the application server. The identity provider can provide the application server with information concerning optional or non-optional interrupt states. An optional interrupt state allows the application server the option to choose whether or not to change (e.g., interrupt) the user's authentication flow. A non-optional interrupt state directs the application server to change (e.g., interrupt) the user's authentication flow.

The application server can send the client application a notification sync event that enables limited sync behavior in cases where normal sync would not occur. The notification event can be sent without changing the client application or protocols used. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In computing, access to services is frequently controlled by an authentication procedure that establishes the identity of the user before the user is granted privileges established for that identity. Traditionally, authentication was based on credentials comprising username and password. If the user provided the correct combination of username and password, access to the service was granted. Legacy protocols and legacy clients (devices or applications) usually provide support for this black-and-white approach to authentication.

A more sophisticated approach to authentication recognizes shades of gray in the authentication process. That is, other factors (e.g., user account state) in addition to user credential evaluation can be evaluated before authentication is considered to be successful. For example, suppose a user presents the right credentials (e.g., correct username and password are provided so user credential evaluation is successful) but the request does not fit a past usage pattern. For example, the request may come from a geographical area that is not recognized for that user (e.g., a user who is based in the United States accesses the service from Asia). This may mean that someone has stolen the user's credentials. Current treatment of failure to adhere to past usage patterns may cause the account to be placed in a soft block mode that triggers the need for rich signaling to the user's device. In contrast, legacy clients or clients using legacy protocols as known in the art may be unable to react to failure to adhere to past usage patterns and may simply authenticate the user. In accordance with aspects of the subject matter described herein, limitations of legacy clients and/or legacy protocols are overcome without changing the client or protocol by generating a new sync event that looks just like a normal sync event to the client but is actually a notification sync event that provides additional information concerning the authentication process to the client or to a user. The notification sync event may be a push event.

When an authentication fails, legacy clients or clients using legacy protocols may generate a generic error message to the user such as "unable to sync". The generic error message typically does not provide enough information so that the user can reliably figure out what the problem is and how to fix it. A richer experience would include notifications that provide explicit error messages (e.g. "Your email cannot be synced because your password expired this morning.") and remediation capabilities (e.g. "Click <here> to update your password now."). Providing richer fault messaging can be difficult because the endpoints (applications or devices) do not support rich error messaging capabilities and are not controlled by the service provider and/or because the client (e.g., the application or the device) relies on legacy protocols that do not support rich error messaging capabilities and cannot be changed by the service provider.

In accordance with aspects of the subject matter disclosed herein, a rich fault messaging experience can be provided for legacy client applications or client applications using legacy protocols without changing the client application or protocol by generating a new sync event that looks just like a normal sync event to the client but is actually a notification sync event that provides additional information concerning the authentication failure to the client or to the user. The notification sync event may be a push event.

The notification sync event between client and server can be driven by coordination between an identity management platform (e.g., an identity provider) or a Security Token Service (an identity management platform that issues authentication and/or authorization tokens) and the application server that syncs to the client. The identity provider can provide responses to the relying party application server or to the client, where the responses are augmented to include error responses that indicate additional authentication evaluation information. For example, the additional authentication evaluation information can comprise information that indicates that the authentication credential evaluation succeeded but user action is needed before authentication can succeed.

The identity provider can provide information to the relying party application server or to the client that is augmented to include interrupt states that provide the relying party application server the ability to change (e.g., interrupt) the authorization flow for the user. The interrupt states can be optional or non-optional. For non-optional interrupt states, the identity provider can provide the relying party application server enough information to change the authorization flow. For optional interrupt states, the identity provider can provide the relying party application server enough information to choose whether or not to change the user's authorization flow and how to handle an interrupt and the associated changed authorization flow. An interrupt state can apply to the entire user account, or to a particular session (e.g. device/user/location is an unfamiliar combination).

The authorization flow can be altered by enabling limited sync behavior. The limited sync behavior can be generation of a notification sync event. The notification sync event can provide fault notification (what the problem is) and/or remediation information (how to fix the problem). The differences between a regular sync event and the notification sync event are transparent to the client so that no changes need to be made on the client. Because no changes are made on the client or to protocols, the subject matter described herein is applicable for use in various contexts including but not limited to access to email applications, line of business applications or other applications on any computing device including but not limited to computers, tablets, smartphones and so on.

While described herein in the context of email clients and authentication, it will be apparent to those of skill in the art that the concepts described herein are equally applicable to any client/service arena and to errors that do not involve authentication. Examples include but are not limited to calendar applications in which the messages sent concern appointments, address book applications in which the leading contact for each letter is the message, cloud storage applications in which the service makes it appear to the client that there is only a single file instead of folders and the file is the message and Voice over Internet Protocol (VoIP) applications in which the message is a single entry or an "offline" message.

Some aspects of the subject matter described herein may operate in a cloud computing environment in which computing services are not owned but are provided on demand. For example, an identity management platform may be on multiple devices or systems in a networked cloud, identity related data may be stored on the same or other devices within the cloud and so on.

Communicating State Information to Legacy Clients Using Legacy Protocols

Figure 1:
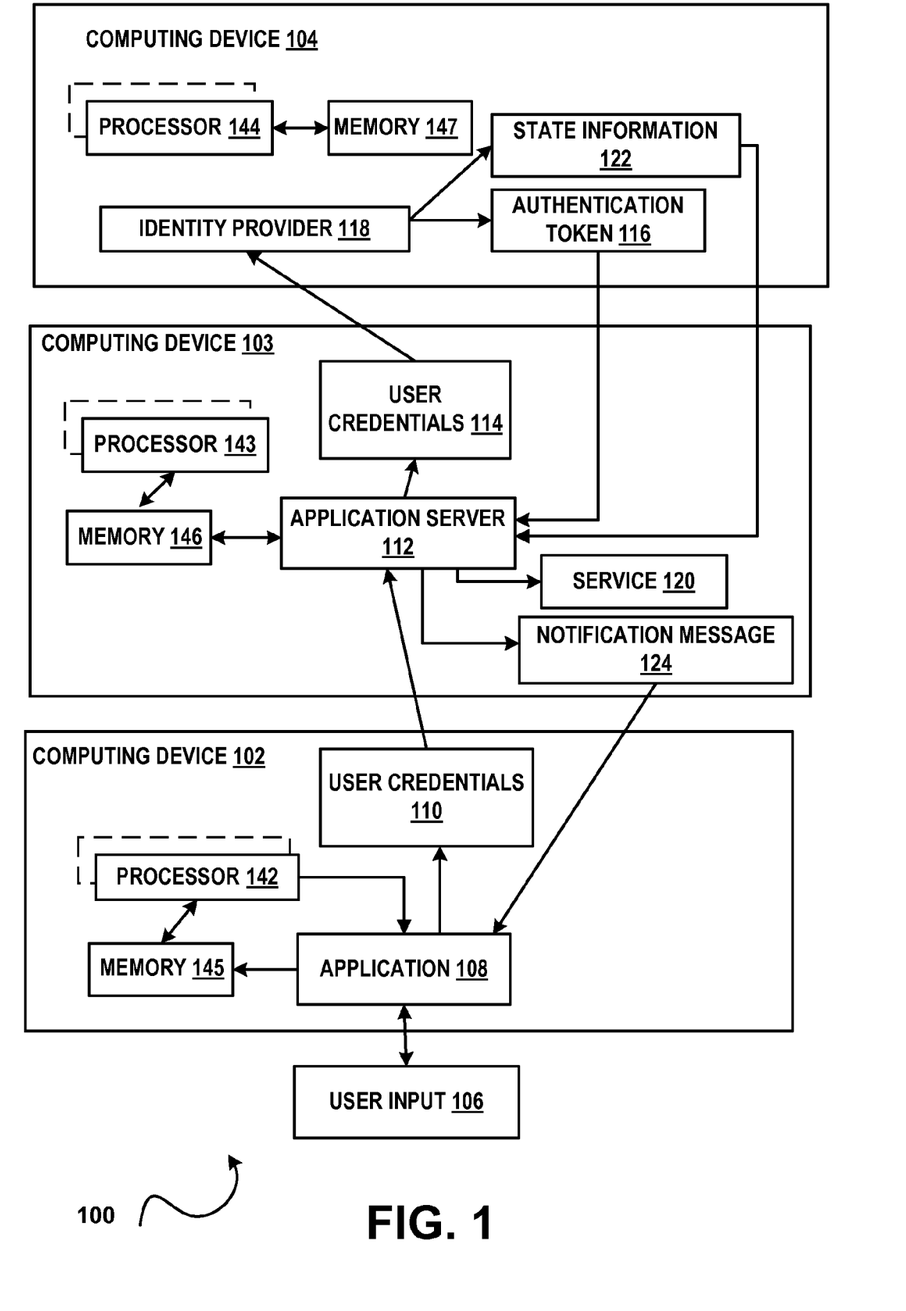
FIG. 1 illustrates an example of a system 100 that communicates state information to legacy clients using legacy protocols in accordance with aspects of the subject matter described herein.

FIG. 1 illustrates a block diagram of an example of a system 100 that communicates state information such as authentication evaluation information to legacy clients using legacy protocols in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 can include any one of or any combination of: a client device such as computing device 102, server computing device such as computing device 103 and/or identity management provider such as computing device 104.

System 100 can include one or more computers or computing devices such as computing device 102. Computing device 102 can be any computing device including but not limited to a tablet, smartphone, personal computer, web appliance or game console. Similarly, aspects of the subject matter described herein can apply to any application, protocol, or service (e.g., a web service, etc.) executing in whole or in part on a computing device that is authenticating on behalf of another. Similarly, aspects of the subject matter can apply to any device including such a computing device. Computing device 102 can include one or more processors such as processor 142, etc., a memory such as memory 145, and one or more modules of a client application such as client application 108. Client application 108 can be any application including but not limited to a legacy application such as an application that does not support rich fault messaging or an application that uses a legacy protocol such as a protocol that does not support rich fault messaging. Client application 108 can be a relying party. Client application 108 may collect user input such as user input 106. User input 106 may include credential information such as username and password. Client application 108 may send user credentials such as user credentials 110 to computing device 103. User credentials 110 may include all or part of user input 106 and any other information regarding the computer device 102 such as device sync state.

System 100 can include one or more computers or computing devices such as computing device 103. Computing device 103 can be any computing device including but not limited to a server computer or a computer that hosts an application server, etc. Computing device 103 can include one or more processors such as processor 143, etc., a memory such as memory 146, and one or more modules of an application such as application server 112. Application server 112 can be a relying party. Application server 112 can receive user credentials 110 from computing device 102 and can send user credentials 110 to computing device 104. Alternatively, application server 112 can receive user credentials 110 from computing device 102 and can generate user credentials 114 from user credentials 110 and can send user credentials 114 to computing device 104. User credentials 114 can differ from user credentials 110 by the addition of information concerning the user's communication, (e.g., where the communication originated, etc.), state of the computing device 102, credentials and so on.

System 100 can include one or more computers or computing devices such as computing device 104. Computing device 104 can be any computing device including but not limited to a computer on which an identity provider or identity management platform, or Security Token Service resides. Computing device 104 can include one or more processors such as processor 144, etc., a memory such as memory 147, and one or more modules of an identity provider application such as identity provider 118. Identity provider 118 can receive user credentials 114 or user credentials 110 from application server 112 and can send an authentication token 116 to application server 112 in response to determining that the user credentials 114 are valid. Authentication token 116 generated by the identity provider 118 can be a token used by application server 112 to access another application or service such as service 120. Authentication token 116 generated by the identity provider 118 can be a scoped or limited-purpose token used by application server 112 to access a different service or to a limited part of another application or service such as service 120. Although service 120 is shown in FIG. 1 as residing on computing device 103, it will be appreciated that service 120 can reside on any computer. Identity provider 118 and application server 112 may reside on the same computer (not shown).

The user account may be in a locked or alternate state in which full normal sync that updates user files is disabled, for any number of reasons including but not limited to: the user's password has expired, the user has changed his password on the application server but not on the client, the user account is throttled, the user account is blocked, sync is blocked, the client has failed a health check (e.g., a device may fail a health check because it does not have an antivirus application installed), the client communication is coming from an unknown, unusual or high risk location, the client is unsupported or misconfigured or is using a deprecated client/protocol version. Throttling refers to the practice of increasing response time or temporarily locking a user account for a time period in response to repeated input of incorrect credentials or other user actions. User accounts can be permanently blocked for lack of compliance with user account agreements. User accounts can be locked when the user credentials have been compromised. User accounts can be locked when user credentials are suspected of being compromised. User accounts can be locked to require the user to rename his account. User accounts can be locked to force a user to change a password. User accounts can be locked to force a user to change secret question/secret answer information. User accounts can be locked to force a change of the way a user proves his identity. User accounts can be locked for periodic changes requested by the administrator (e.g., account detail review or maintenance check sometimes referred to as "spring cleaning"). User accounts can be locked to force the user to add identity proofs when the account is set up (referred to in the art as "first proofs").

Identity provider 118 may send additional state information 122 to application server 112. Additional state information can include information concerning the state of the authentication process for the user's credentials. The identity provider may determine that the user credentials are valid so that credential evaluation succeeded but that the user account is in a locked state or in an alternate state for which normal syncing is disabled so that authentication failed. That is, even though credential evaluation was successful, authentication failed because the user account or device is in an alternate or locked state. This information can be sent to the application server as state information 122. The state information sent to the application server can indicate that the user's password has expired, that the user has changed his password on the application server but not on the client, that the user account is throttled, that the user account is blocked, that sync is blocked, that the client has failed a health check, that the client communication is coming from an unknown, unusual or high risk location, that the client is unsupported or misconfigured or is using a deprecated client/protocol version, etc. The state information sent to the application server can indicate that throttling has occurred because of repeated input of incorrect credentials or other user actions.

The state information sent to the application server can indicate that the user account was permanently blocked for lack of compliance with user account agreements and can indicate the type of non-compliance. The state information sent to the application server can indicate that the user was locked because the user credentials were compromised, because the user credentials may have been compromised, because the user has to rename his account, because the user has to change a password, because the user has to change secret question/secret answer information, because the user has to change the way he proves his identity, because of account detail review or maintenance check, because the user has to add identity proofs and so on. The state information sent to the application server can indicate actions that can be taken to remedy the fault so that authentication can succeed.

The state information sent to the application server can be used by the application server to generate a notification message such as notification message 124. The notification message can include the fault messages described above, received from the identity provider or based on information provided by the identity provider. The notification message can include actions that can be taken to remedy the fault so that authentication can succeed. The actions that can be taken to remedy the fault can be determined by the application server.

Client application 108 can be, for example, a client email application (e.g., an email application that is built in to a smartphone) that does not support rich fault messaging. Client application can be an application that supports rich fault messaging but uses a legacy protocol that does not support rich fault messaging. Legacy protocols include but are not limited to POP, IMAP, Exchange Active Sync, and others. Some legacy protocols communicate over HTTP (or HTTPS) and are designed for the synchronization of email, contacts, calendar, tasks and/or notes from a messaging server to a mobile device (e.g., Exchange ActiveSync or any other suitable legacy protocol). Legacy protocols can include rich client interfaces used for authentication of clients, smartphones, game consoles, etc.

Suppose, for example, the user input 106 provided to the client email application includes an expired password. If the application server uses basic (legacy) authentication, when the user tries to access the email application (application 108) on his device (computing device 102), the user's credentials (user credentials 110) can be sent from his computing device 102 to the application server (application server 112, e.g. Exchange Online) using the legacy protocol (e.g., Exchange ActiveSync). The application server can send user credentials (e.g., either the same way the user credentials were received, user credentials 110 or perhaps with additional information (e.g., state) or formatted differently as user credentials 114 to an identity provider such as identity provider 118 (e.g., Windows Azure Active Directory).

Suppose that the user account has been locked because the password has expired. The identity provider can return an explicit fault message to the application server. For example, the fault message can be, "Your password has expired. To reset your password, click here <link>." or can be another appropriate message. The application server can use the information provided by the identity provider to fire a notification sync event. The notification sync event can be pushed to the client. For example, the notification sync event can be an email which is pushed to the client, to the user's smartphone inbox, for example. The email can include explicit error information such as, for example: "Your password expired this morning.". The email can include explicit remediation information such as, for example: "Click here to update your password now.". From the client perspective, the notification sync event is indistinguishable from a traditional email sync event so no changes are needed on the client. However, instead of actually syncing the client email inbox, only the email including the fault information that is the result of the negotiation between the identity provider and the application server is sent. Optionally, the application server can increment a counter to ensure the notification sync event is performed no more than once.

Alternatively, the identity provider can return a scoped or limited-purpose token to the client application 108. The client application 108 can send the scoped token to the application server 112. A scoped token is a token that allows the application server to perform a limited task or set of tasks within a service instead of providing access to the whole service. The scoped token may be a token that directs the application server 112 to send a notification sync event to the client application 108. The client application 108 does not need to be able to decrypt the token or to read the contents of the token and may not know that the token is a scoped token. The client application 108 can send the scoped token to the application server 112. The application server 112 can decrypt the token and can determine that a notification sync/push event is to be sent. For example, the decrypted token may instruct the application server 112 to push an email message to the user's smartphone inbox with explicit issue and remediation information as described above. From the client perspective, the notification sync event is indistinguishable from a regular sync event. Optionally, the application server can increment a counter to ensure the notification sync event is performed no more than once.

In yet another example, a user may attempt to sync email on his mobile phone or smartphone. The user communication may be coming from an unknown location, from a location not usually associated with the user, or from a location that has been designated an "unsafe" location, that is, a location that is often associated with stolen credentials. The client application can send the user credentials to the application server. The application server can send the credentials to the identity provider. The identity provider can determine that the credentials are valid but that because the communication account is coming from a high risk location and can place the account in a locked state. The identity provider can provide this information to the application server. In response to receiving the information provided by the identity provider, the application server can determine that a notification sync push event is to be fired to the client application. To the client application the notification sync push event (an email) is indistinguishable from a normal sync event (one or more emails). The notification sync push event email can provide explicit fault information such as "Your present location is not recognized. Please click here <link> to solve identity challenge." or other suitable message. In response to clicking on the link, the user may be directed to a mobile browser, where the identity challenge can be presented to the user. In response to correctly responding to the identity challenge, the user's mobile device can be unlocked, allowing sync. In response to failing the identity challenge, the device can remain in a locked state.

It will be appreciated that the message or messages returned to the client can be a human-readable message, a machine-readable message, or a combination thereof. For example, an email message indicating that a password has expired can include a tag in the email header that some clients ignore, but that some clients can recognize and that can trigger other user interaction such as but not limited to launching a change-password web page. Similarly, if passwords are being rotated, when an outdated password is used, an advanced client may be triggered by the machine-readable message to fetch the new password and automatically update the password for the device, without human intervention or interaction.

Figure 2A:
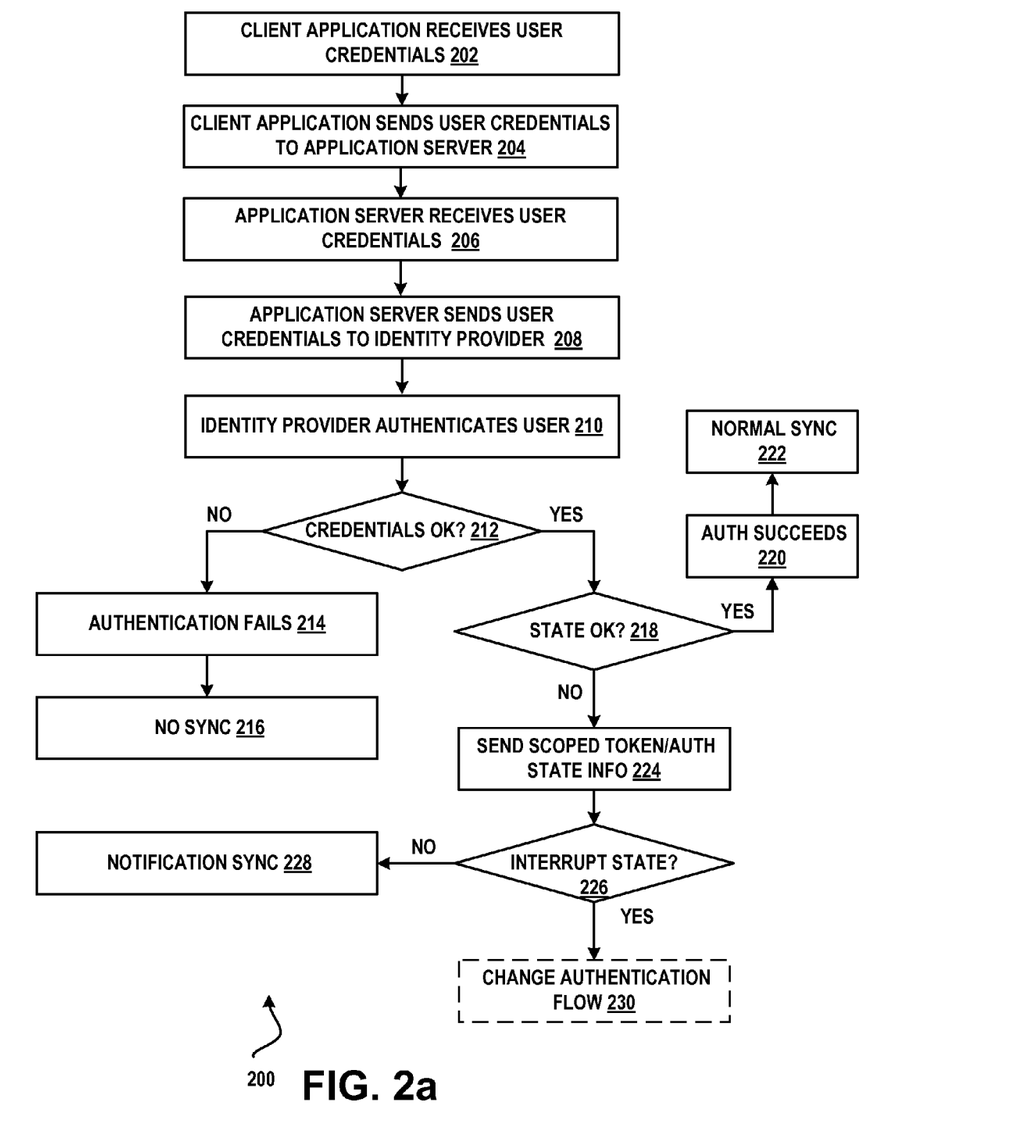
FIG. 2a illustrates an example of a method 200 that communicates state information to legacy clients using legacy protocols in accordance with aspects of the subject matter disclosed herein.

FIG. 2a illustrates a method 200 that can communicate state information to a legacy client using a legacy protocol in accordance with aspects of the subject matter described herein. The method described in FIG. 2a can be practiced by a system such as but not limited to the one described with respect to FIG. 1. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 credentials (e.g., user authentication credentials provided by a user, for example) can be received by a client application executing on a client device. As described above, the client device can be a legacy device (one that does not provide rich fault messaging) or can be a device that can provide rich fault messaging but uses a legacy protocol that does not support rich fault messaging. At operation 204 the client application can send the credentials to an application server. At operation 206 the credentials sent by the client application can be received by an application server. At operation 208 the application server can send the credentials and optionally, additional information (state) such as but not limited to a geographical location of the user device to an identity provider or other identity management platform. At operation 210 the identity provider can begin to authenticate the user.

At operation 212 the identity provider can determine if the user credentials are valid. In response to determining that the user credentials are not valid, authentication fails at operation 214 and no sync occurs at operation 216. In response to determining that the credentials are valid at operation 218, the state information associated with the authentication process is evaluated. If the state of the authentication is determined to be normal, authentication succeeds at operation 220 and normal sync can occur at 222. If evaluation of the state of the authentication results in a determination that the user account is in a locked or alternate state, a scoped token can be sent to the application server at 224. Additional information such as the nature of the state of authentication can also be sent to the application server at 224. At operation 226 whether or not the device is in an interrupt state can be determined. At 228 in response to determining that the device is not in an interrupt state, the application server can perform a notification sync at operation 228 as described more fully above. At 230 in response to determining that the device is in an non-optional interrupt state, the application server can change (e.g., interrupt) the authentication flow. If the interrupt state is optional, the application server can decide to change the authentication flow or not.

Figure 2B:
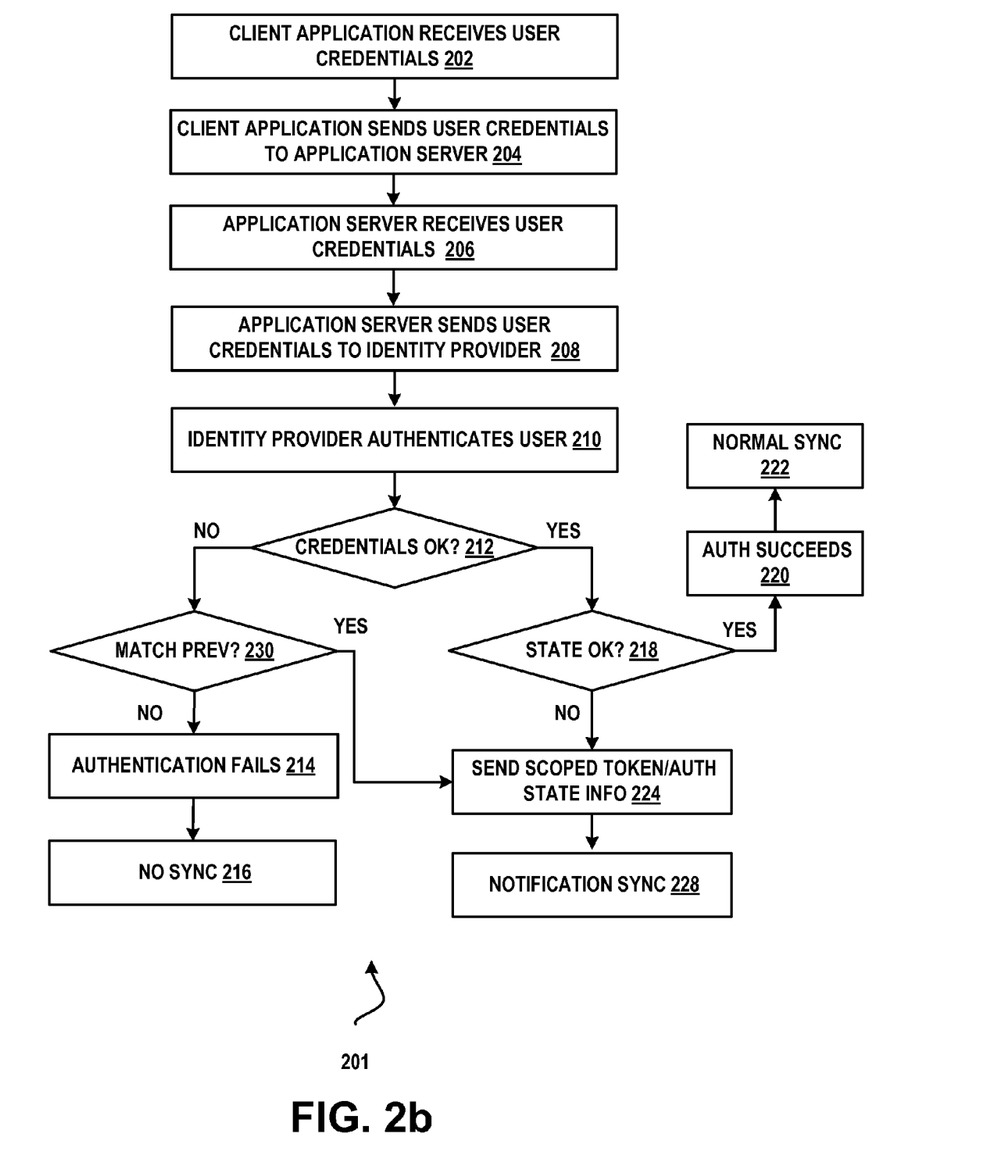
FIG. 2b illustrates another example of a method 201 that communicates state information to legacy clients using legacy protocols in accordance with aspects of the subject matter disclosed herein.

FIG. 2b illustrates a method 201 that can communicate state information to a legacy client using a legacy protocol in accordance with aspects of the subject matter described herein. The method described in FIG. 2b can be practiced by a system such as but not limited to the one described with respect to FIG. 1. While method 201 describes a series of operations that are performed in a sequence, it is to be understood that method 201 is not limited by the order of the sequence. For instance, some operations may occur in a different order than that described. In addition, one operation may occur concurrently with another operation. In some instances, not all operations described are performed.

At operation 202 credentials (e.g., user authentication credentials provided by a user) can be received by a client application executing on a client device. As described above, the client device can be a legacy device (one that does not provide rich fault messaging) or can be a device that can provide rich fault messaging but uses a legacy protocol that does not support rich fault messaging. At operation 204 the client application can send the credentials to an application server. At operation 206 the credentials sent by the client application can be received by an application server. At operation 208 the application server can send the credentials and optionally, additional information (state) such as but not limited to a geographical location of the user device to an identity provider or other backend platform. At operation 210 the identity provider can begin to authenticate the user.

At operation 212 the identity provider can determine if the user credentials are valid. In response to determining that the user credentials are not valid but that the user credentials match previous user credentials at operation 230, a scoped token can be sent to the application server at 224. Information indicating that the credential information received from the user has expired can also be sent to the application server at operation 224. At operation 228 the application server can perform a notification sync that indicates, for example, that the password on the device has not been updated and requesting the user to update his password on the device (e.g., in the settings). In response to determining at operation 230 that the credentials do not match previous credentials, authentication fails at operation 214 and no sync occurs at operation 216.

Example of a Suitable Computing Environment

Figure 3:
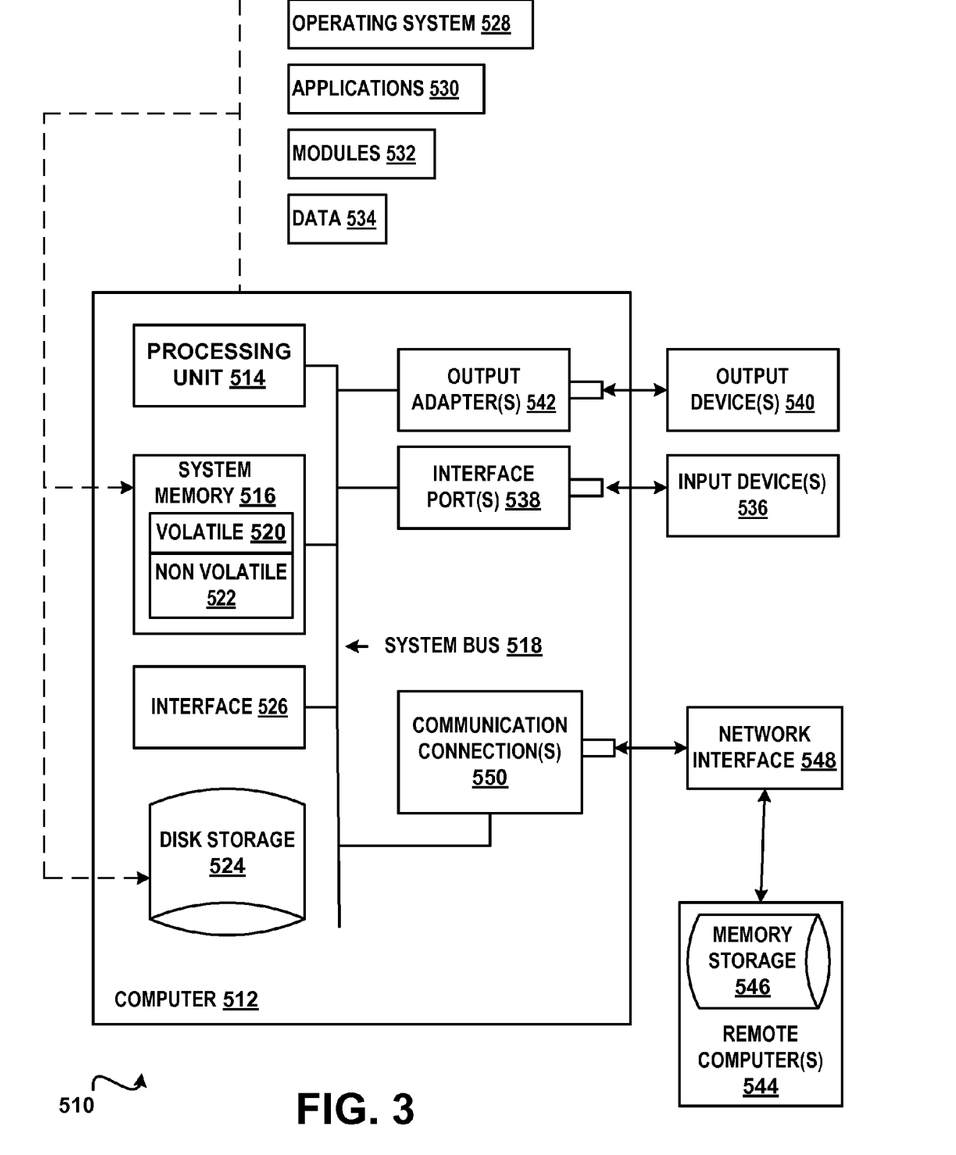
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
at least one processor of an application server computing device;
a memory of the application server computing device; and
at least one module loaded into the memory causing the at least one processor to:
receive authentication evaluation state information from an identity provider in response to unsuccessful authentication of a user of a client device, wherein credentials received by the identity provider for the user are valid but the client device is in an alternate state in which full synchronization is prevented; and
send a notification message to a client application executing on the client device, usurping the client application's existing synchronization mechanism, the notification message comprising information identifying a cause of the unsuccessful authentication of the user.

2. The system of claim 1, further comprising
sending a notification message to the client application usurping the client application's existing synchronization mechanism, the notification message comprising remediation information for the cause of the unsuccessful authentication of the user.

3. The system of claim 1, wherein a protocol used by the client application's existing synchronization mechanism is a protocol comprising one of: POP, IMAP, Exchange Active Sync, or a legacy client-server communication protocol.

4. The system of claim 1, wherein the client application's existing synchronization mechanism fails to support a mechanism to identify a reason for the unsuccessful authentication of the user.

5. The system of claim 1, wherein the client application's existing synchronization mechanism fails to support a mechanism to remediate the unsuccessful authentication of the user.

6. The system of claim 1, wherein the notification message sent to the client application identifies the cause of the unsuccessful authentication of the user as one of: expiration of a password of the user; a password on the application server computing device does not match a corresponding password on a client device; a user account is throttled; the user account is blocked; the client device fails to pass a health check; a communication sent from the client device comes from an unknown, unusual or high risk location; the client device is unsupported; the client device is misconfigured; the client device is using a deprecated client/protocol version; the user account is blocked because of non-compliance of the user with a user account agreement; credentials belonging to the user have been compromised; credentials belonging to the user are suspected of being compromised; the user has to rename his account; the user has to change a password; the user has to change secret question/secret answer information; the user has to change how the user proves the user's identity; for account detail review; for maintenance check; or identity proofs have to be added.

7. The system of claim 1, wherein the notification is machine readable.

8. The system of claim 7, wherein in response to receiving the machine readable notification, at least one remediation action can be automatically performed.

9. A method comprising:
receiving by a processor of an application server computer, authentication evaluation state information from an identity provider, in response to an unsuccessful authentication of a user of a client device, wherein in response to receiving invalid credentials for the user a user account of the user is placed in an alternate state in which full synchronization of the client device is prevented; and
sending a fault notification message to a client application executing on the client device, usurping the client application's existing synchronization mechanism, the fault notification message comprising information to remediate the unsuccessful authentication of the user of the client device.

10. The method of claim 9, further comprising:
sending a fault notification message to a client application executing on the client device, using the client application's existing synchronization mechanism, the fault notification message comprising information identifying a cause of the unsuccessful authentication of the user, the cause comprising one of: expiration of a password of the user, a password on the application server computer does not match a corresponding password on the client device, the user account is throttled, the user account is blocked, the client device fails a health check; a communication sent from the client device comes from an unknown, abnormal or high risk location, the client device is unsupported, the client device is misconfigured, the client device is using a deprecated client/protocol version, the user account is blocked because of non-compliance of the user with a user account agreement; credentials belonging to the user have been compromised; credentials belonging to the user are suspected of being compromised; the user has to rename the user account; the user has to change a password; the user has to change secret question/secret answer information; the user has to change how the user proves the user's identity; for account detail review; for maintenance check; or identity proofs for the user have to be added.

11. The method of claim 9, further comprising:
receiving information concerning an optional interrupt state enabling the application server computer to choose whether or not to change the authentication flow for the user.

12. The method of claim 9, further comprising:
receiving information concerning a non-optional interrupt state directing the application server to interrupt the authentication flow for the user.

13. The method of claim 9, further comprising:
sending the client application a notification sync event that enables limited sync behavior when full sync is disabled.

14. A computing device, comprising:
at least one processor and a memory;
the at least one processor is configured to:
receive authentication evaluation state information from an identity provider in response to unsuccessful authentication of a user of a client device, wherein credentials received by the identity provider for the user are valid but a user account of the user is locked because of a fault condition; and
send a notification message to a client application executing on the client device, using the client application's existing synchronization mechanism, the notification message comprising information identifying the fault condition and providing remediation information to correct the fault condition, wherein the client application's existing synchronization mechanism updates at least one user data file on the client device.

15. The computing device of claim 14, wherein the at least one processor is further configured to:

send the notification message to the client application executing on the client device, the notification message comprising a push event.

16. The computing device of claim 14, wherein the at least one processor is further configured to:
send the notification message to the client application executing on the client device, the notification message indistinguishable by the client application from a user data file updating sync event.

17. The computing device of claim 14, wherein the at least one processor is further configured to:
alter an authorization flow by enabling limited sync behavior.

18. The computing device of claim 14, wherein the at least one processor is further configured to:
push a notification sync event to the client application.

19. The computing device of claim 14, wherein that at least one processor is further configured to:
send the notification message to the client application executing on the client device without changing the client application.

20. The computing device of claim 14, wherein the at least one processor is further configured to:
send the notification message to the client application executing on the client device without changing a protocol used by the client application.

* * * * *